United States Patent [19]

Bizjak et al.

[11] Patent Number: 5,003,412
[45] Date of Patent: Mar. 26, 1991

[54] METHOD AND APPARATUS FOR POSITIONING A READ/WRITE MECHANISM

[75] Inventors: John F. Bizjak, San Jose; Leonard R. Shenfield, Saratoga; Scott D. Miller, San Jose; Philip C. Kenny, Los Altos; William Benson, San Mateo; Michael I. Behr, Pasadena, all of

[73] Assignee: Brier Technology, Inc., San Jose, Calif.

[21] Appl. No.: 116,109

[22] Filed: Oct. 30, 1987

[51] Int. Cl.$^5$ ............................ G11B 5/58; G11B 21/02
[52] U.S. Cl. ...................................... 360/77.01; 360/75; 360/77.07; 360/77.12; 369/43
[58] Field of Search ............... 360/77, 78, 76, 77.01, 360/77.02, 77.03, 77.05, 77.07, 77.08, 77.11, 78.01, 78.02, 78.04, 78.11, 78.14, 78.15; 369/14, 32, 33, 41, 43, 44

[56] References Cited

U.S. PATENT DOCUMENTS

| | | | |
|---|---|---|---|
| 3,175,205 | 3/1965 | Auyang | 360/77.07 |
| 3,212,074 | 10/1965 | Daniels et al. | 360/78.11 |
| 3,426,337 | 2/1969 | Black et al. | 360/77.03 |
| 4,371,960 | 2/1983 | Kroiss | 360/77.02 |
| 4,587,579 | 5/1986 | Cocke et al. | 369/14 |
| 4,700,244 | 10/1987 | Fasen et al. | 360/77.05 |

OTHER PUBLICATIONS

IBM TDB vol. 23, No 2 "Servo System for Magnetic Recording Based on Time Comparsion" Gruss et al., 7/80, pp. 787–789.

Electronics, "Magneto-Optics Packs 5 cm Disk with 10 Megabytes" Gosch, 12/29/82, pp. 45–46.

*Primary Examiner*—Aristotelis M. Psitos
*Assistant Examiner*—Steven R. Garland
*Attorney, Agent, or Firm*—Hecker & Harriman

[57] ABSTRACT

The present invention describes a time based servo pattern scheme which provides position and velocity information with high accuracy. A plurality of servo lines are formed on a data disk extending from the inner track to the outer track, In the preferred embodiment of the present invention, these lines are employed as part of a buried servo scheme such that the entire useable disk surface is dedicated to data storage. The servo pattern is written on each side of the disk so that, if the disk were transparent, the respective servo lines would appear to intersect when viewed from above. Servo heads located on each side of the disk detect servo line crossings. By comparing the time difference between crossings of corresponding tracks on either side of the disk, the radial position of the heads can be determined. Therefore, even when nominal track centers do not fall on servo line intersections, their position can be determined accurately. Thus, the servo pattern of the present invention is track pitch independent. A concentric calibration track is formed on the disk surface so that offsets between the desired servo and data head positions may be detected and compensated.

28 Claims, 6 Drawing Sheets

FLEXIBLE MEDIA CROSS SECTION

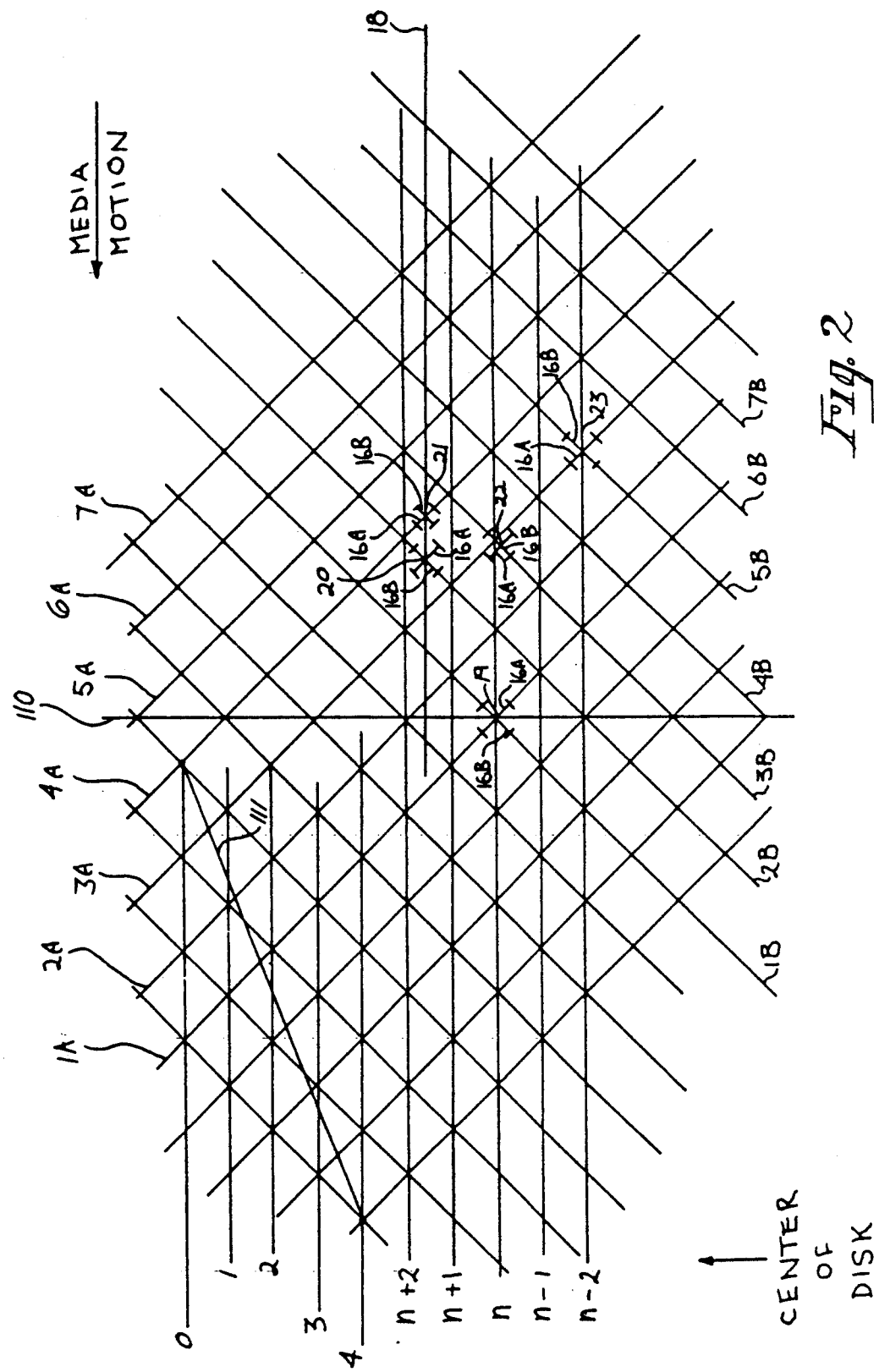

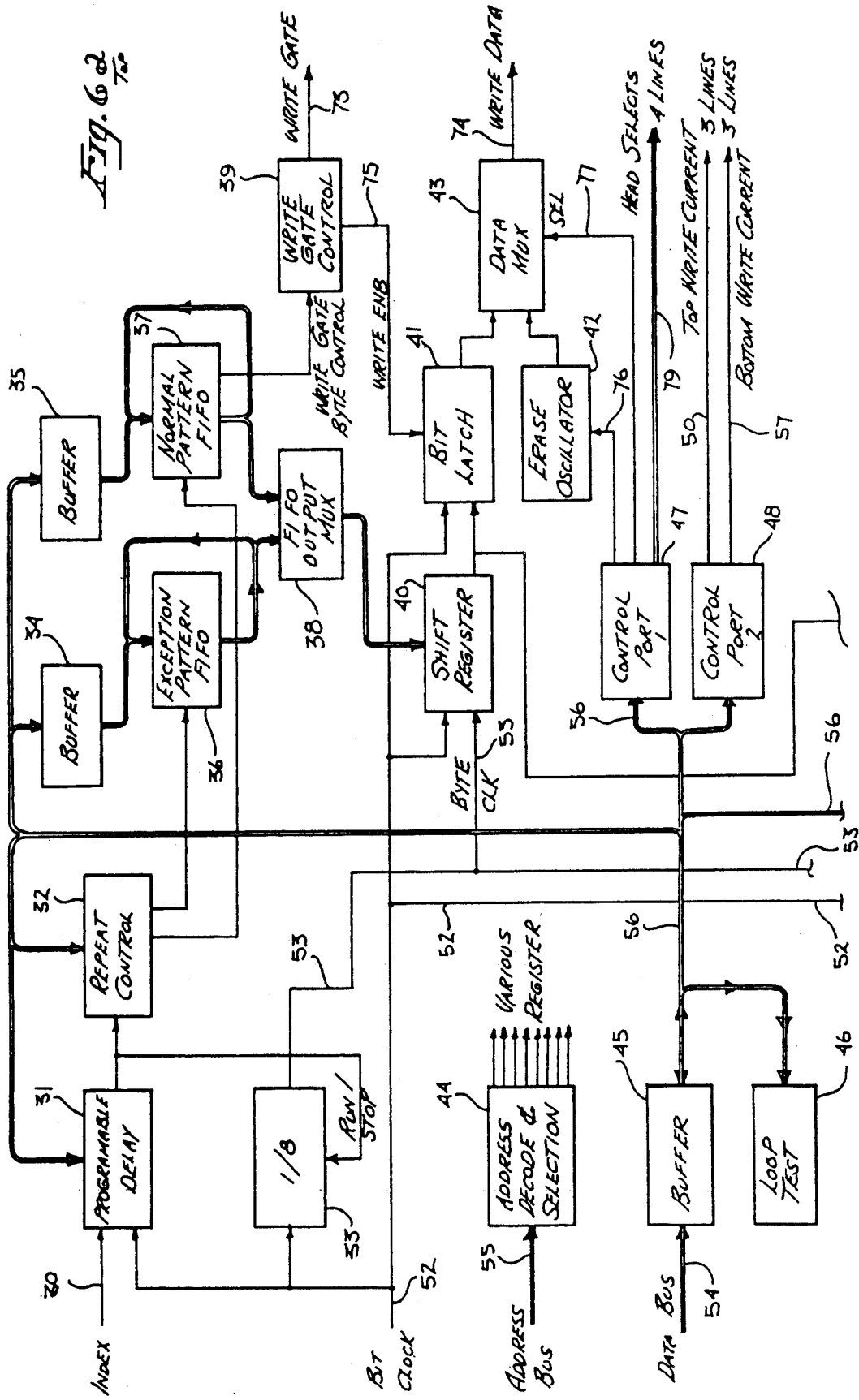

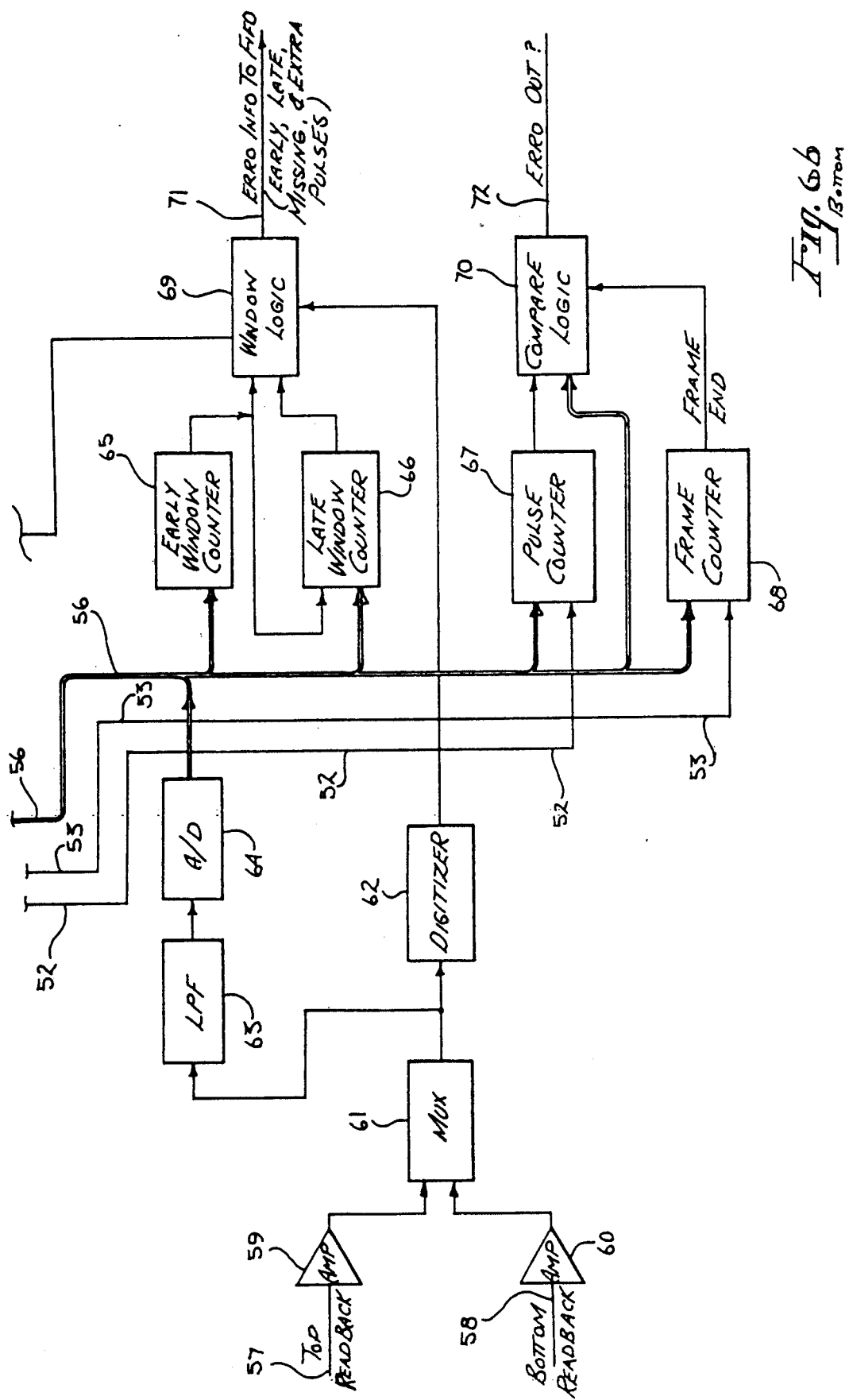

METHOD AND APPARATUS FOR POSITIONING A READ/WRITE MECHANISM

BACKGROUND OF THE INVENTION

1. Field of the Invention

This invention relates to the field of servo patterns for information storage media.

2. Background Art

Information is written on data storage disks in concentric tracks which are accessed by read/write heads. To accurately access the data tracks, servo information is also written onto storage disks and provides positioning information. It too is ordinarily written in concentric tricks. In a multi-disk storage environment, one entire side of a storage disk may be dedicated to servo information. A servo head accesses this servo disk to read the position information therein. Since the servo head is in a fixed relationship relative to the read/write heads, the position of the servo head can be used to indicate the position of the read/write heads. In addition to having a dedicated surface for servo information, a "sector" servo pattern may be employed in which pie shaped wedges of servo information are interleaved between sections of data information.

These are three basic types of servo patterns currently employed in magnetic disk storage schemes, namely amplitude based, frequency based and pulse detection based. Amplitude based servo patterns rely on differences in amplitude between successive sections of the servo pattern to provide position information. Frequency based servo patterns typically use side by side servo tracks of different frequencies. The interface between these frequencies is a nominal track center. A servo head compares the amplitude of the two different frequencies to determine the track center. Pulse detection based servo patterns utilize dibit, tribit, or quadbit patterns to provide position information.

In order to improve the efficiency of data storage in magnetic disk systems, it is desired to maximize the data storage capability. Any disk surface area which is dedicated to servo tracks cannot be used for data tracks. One method of freeing up space for data tracks is to "bury" the servo layer beneath the surface of the data disk itself. There are several disadvantages associate with the use of prior art servo patterns in a buried servo scheme. One disadvantage is a large swing in amplitude due to disk media variations, amplitude reduction as track density is increased and amplitude detection problems inherent with the use of a buried servo layer. Further, adequate frequency separation between the data tracks and the servo tracks must be provided to allow the decoding circuitry to separate the signals and thereby prevent cross talk. However, such frequency separation may result in a servo pattern lacking the desire tracking accuracy.

Therefore, it is an object of the present invention to provide a servo pattern for use with a buried servo scheme which is amplitude and pitch independent.

It is a further object of the present invention to provide a servo pattern which provides adequate separation of data and servo signals to prevent cross talk.

It is yet another object of the present invention to provide a servo pattern providing highly accurate tracking and position information.

SUMMARY OF THE PRESENT INVENTION

The present invention describes a time based servo pattern scheme which provides position and velocity information with high accuracy. In the present invention, a plurality of first servo lines are formed in a storage layer. The first plurality of servo lines are non-intersecting and extend from one edge of the storage layer to a second edge. A plurality of second servo lines are also formed in the storage layer, with the second servo lines also being non-intersecting and extending from the first edge to the second edge of the storage layer. The first servo lines intersect the second servo lines at a fixed angle so as to create a plurality of points of intersection. Detecting means are disposed adjacent the storage layer for detecting the first and second servo lines and outputting first and second detection signals upon detection of each of the first and second servo lines respectively. Decoding means are coupled to the detection means for receiving the first and second detection signals and determining a time difference between the occurrence of the first and second signals. By measuring the time difference, and determining whether the first or second servo line was first detected, the position of the detection means as being on one side or the other of a servo line intersection may be determined. By further knowing the number of each of the first and second servo lines which have been detected, and the time difference, the position of the detection means between the first and second edges may also be determined.

In the preferred embodiment of the present invention, a plurality of servo lines are formed on a data disk extending from the inner track to the outer track. in the preferred embodiment of the present invention, these lines are employed as part of a buried servo scheme such that the certified disk surface is dedicated to data storage. The servo pattern is written on each side of the disk so that, if the disk were transparent, the respective servo lines would appear to intersect when viewed from above. Servo heads located on each side of the disk detect servo line crossings. By comparing the time difference between crossings of corresponding tracks on either side of the disk, the radial position of the heads can be determined. Therefore, even when nominal track centers do not fall on servo line intersections, their position can be determined accurately. Thus, the servo pattern of the present invention is track pitch independent.

Servo lines of the present invention are created by positioning a servo writing head at one edge of the storage layer. A clock signal is provided to synchronize the writing of servo line segments at the edge position by the servo writing head. After a series of line segments are written, the servo writing head is advanced and a second series of line segments are written on the storage layer. The second series of servo line segments are delayed by a pre-determined amount so that the combination of the line segments form a curve, in the preferred embodiment, a logarithmic or equiangular spiral. After the second series of line segments is written, the servo writing head is backed up so that verification of the pattern may be made. If the pattern is verified, the servo head is moved forward 2 steps to being writing the next series of line segments. This process continues until the second edge of the data layer is reached.

In the preferred embodiment, a servo disk having the first and second servo lines written on opposite sides of the disk is utilized. Separate servo heads are disposed on each side of the disk. In the present invention, it is necessary to know the exact relationship between the intersection of first and second servo heads and the distance to the center of each data head. For example, in the ideal embodiment, the servo heads will detect their respective servo lines simultaneously at a servo line intersection. However, if there is offset introduced between the heads, such simultaneous detection will not occur. Therefore, the preferred embodiment of the present invention contemplates a calibration track disposed on a disk surface. The calibration track has a nominal center at a known set of servo line intersections. The calibration track, in one embodiment, utilizes an amplitude comparison scheme to position the data heads. When a data head is positioned over its calibration track, any variation in the spacing of the center of that data head to the intersection of the two servo heads will be indicated by a time difference in the occurrence of detection in the first and second servo lines respectively. This time difference can then be built in as an offset or compensating factor in the detection circuitry of the present invention.

BRIEF DESCRIPTION OF THE DRAWINGS

FIG. 2 is a top view of the servo pattern of the present invention.

FIGS. 6A and 6B are a block diagram illustrating the servo write circuitry of the present invention.

DETAILED DESCRIPTION OF THE PRESENT INVENTION

A servo pattern for use with magnetic media disk storage is described. In the following description, numerous specific details, such as number of lines, bit cells per frame, frames per revolution, etc., are described in order to provide a more thorough description of the present invention. It will be obvious, however, to one skilled in the art, that the present invention may be practiced without these specific details. In other instances, well known features have not been described in detail in order not to unnecesarily obscure the present invention.

The preferred embodiment of the present invention is employed as part of a buried servo scheme. In the present invention, a data storage disk includes a plurality of first servo lines buried on one surface of a disk beneath a data layer. A second plurality of servo lines are buried on the second surface of the disk beneath a second data layer. The servo lines are logarithmic spirals extending from an inner radius of the disk to an outer radius. The servo lines converge toward the inner radius. By utilizing a logarithmic spiral shape for the servo lines, the servo lines will intersect a radial line of the disk at a constant angle anywhere along the servo line. Thus, a servo head at the end of an actuator arm assembly and moving in a radial line on the disk will intersect the servo line at the same angle at each point of the servo line. This allows for maximum signal detection by the servo head at all radial positions.

Because the servo lines are disposed at an angle to the concentric data tracks, cross talk between the data and servo tracks is minimized. As the angle between a read head and an information track becomes greater, the amount of signal detection lessens until a point is reached, the "azimuth" angle, at which no detection occurs. By maximizing the angle between the servo lines and the data tracks, the azimuth effect is maximized, reducing unwanted interference and cross talk between the two tracks. Because, the present invention utilizes a "presence/absence" and time based detection scheme, amplitude differences caused by disk media variations do not affect the servo pattern of the present invention. Likewise, because servo tracks are independent of the data tracks, a relatively large servo head may be utilized, allowing for easier detection of varying signals.

Figure 1:
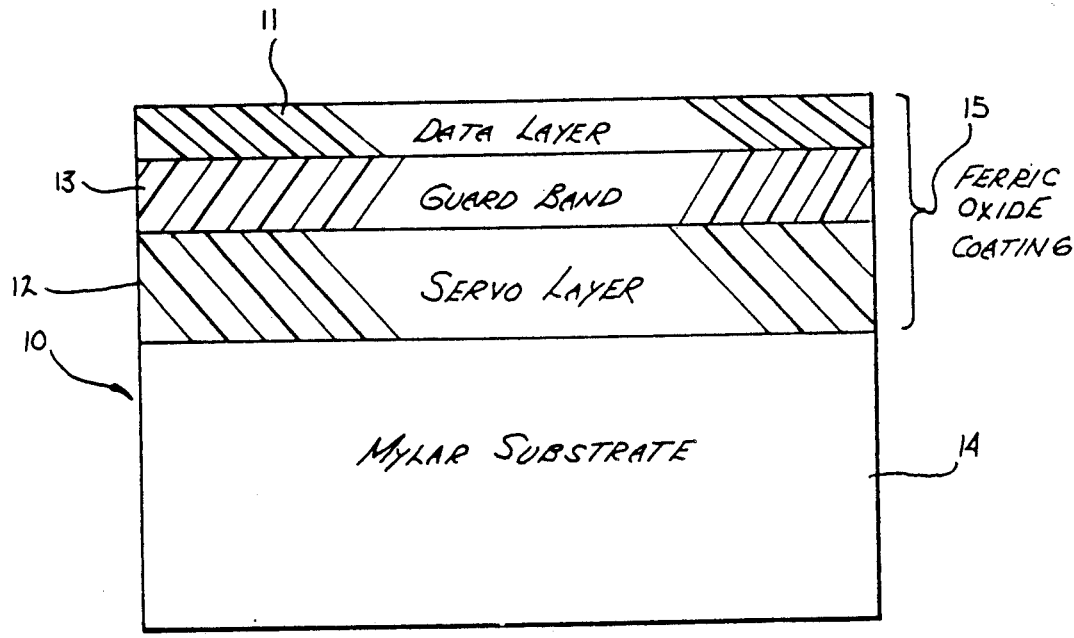
FIG. 1 is a cross sectional view of a magnetic storage media.

Referring to FIG. 1, a cross sectional view of a magnetic storage media is illustrated. The magnetic media 10 comprises a mylar substrate layer 14 on which is formed a ferric oxide coating 15. The ferric oxide coating 15 is logically divided into 3 layers in the preferred embodiment of the present invention. The lowermost layer, closest to the mylar substrate, is used for storing servo information. This servo layer 12 is written by using a wide gap servo write head so that the servo signals are written more deeply into the ferric oxide coating. The gap width of the data read/write head is chosen so that the data layer 11 does not extend into the servo layer 12. Rather, a guard band 12 (containing no information) exists between the data layer 11 and servo layer 12. This guard band aids in preventing accidental erasure of the servo layer during normal read/write operations. It further aids in reducing cross talk between the data and servo layers.

In the preferred embodiment of the present invention, the servo pattern scheme is utilized with a flexible magnetic media. However, it would be obvious, to one skilled in the art, that the present invention has equal application to magnetic tape drives and to rigid media storage systems such as Winchester hard disk drives.

A number of buried servo schemes have been disclosed in the past. For example, the U.S. Pat. Nos. 3,614,756 to McIntosh; 3,956,769 to Beecroft et al; and 4,581,663 to Tanaka. However, these prior art schemes rely on frequency and amplitude variation between the servo and data tracks, leading to unwanted cross talk and inaccurate positioning.

Figure 3:
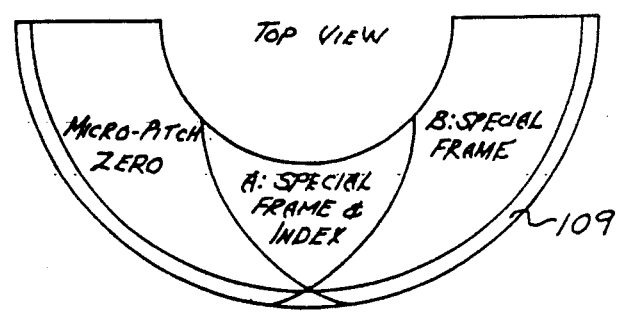
FIG. 3 is a top view of a servo disk employing a servo pattern of the present invention.

A top view of the servo pattern of the present invention is illustrated in FIG. 3. Servo lines A and B are shown intersecting at location 24. Servo lines a and B are drawn as logarithmic spirals. A logarithmic spiral has the property that a radial line drawn from the origin always intersects the spiral at the same angle. A logarithmic spiral is chosen so that the servo head will intersect a servo line at the same angle regardless of the servo head position on the disk. Thus, the signal loss due to azimuth angle considerations is not a factor when using a logarithmic spiral.

In the preferred embodiment of the present invention, a number of such logarithmic spirals are written onto the servo disk at regular intervals. At selected intervals, a servo line is omitted so as to provide a framing signal for use with servo circuitry. Alternatively, additional servo lines could be written onto the surface of the disk as a frame indicator as well. The framing information may be periodic, occurring more than once on the disk surface, or a single framing indicator may be utilized. In the preferred embodiment of the present invention, the data tracks are written concentrically or in a spiral as is typical in the prior art. The angle of the servo lines with respect to the data tracks is chosen to be at an angle so as to minimize cross talk between data and servo heads. The angle where no cross talk occurs is the "azimuth point". The azimuth point is the point in which the angle between an information track (data or servo) on a magnetic disk and a read head becomes too great for a detection of the signal. In the present invention, a data head is positioned in a conventional manner to read data tracks on the magnetic disk. As noted, the servo information is written onto the disk at an angle to the data information. A separate servo head is then positioned at the same angle with respect to the read/write head so that the reading of the servo information by the servo head is optimized.

The servo pattern of the preferred embodiment of the present invention is illustrated in FIG. 2. The view of FIG. 2 is a top view of the servo pattern of the present invention as it would appear on a transparent disk. In the example FIG. 2, the top of the figure is toward the center of a disk, and the bottom of the figure is toward the outside radius of a disk. In this example, media motion is from right to left so that the apparent motion of a read/write head is from left to right. A plurality of parallel servo lines "A" are written on one side of a disk. A second plurality of servo lines "B" are written on the other side of the disk so that, when viewed from above, the A and B tracks appear to intersect.

Servo heads 16A and 16B are disposed on either side of the disk and are associated with servo lines A and B respectively. Heads 16A and 16B also appear to intersect at right angles when viewed from above in the preferred embodiment of the present invention. However, the heads need not intersect so long as their spatial relationship is fixed and known. Heads 16A and 16b are shown in several locations in FIG. 2 by way of example.

Sections of data tracts $n+2$, $n+1$, $n$, $n-1$ and $n-2$ are illustrated in FIG. 2. In one embodiment of the present invention, the nominal centers of these tracks are located at servo line intersections such as location 19. Location 19 illustrates the situation in which servo heads 16A and 16B are accurately positioned on a track center, in this case track n.

The track locating system of the present invention is a time based system. In operation, the time difference between the crossing of a servo line by servo head 16A and the crossing of the corresponding servo line by servo head 16B is measured and used to indicate servo head position relative to a data track. At location 19, servo head 16A crosses servo line 1A at the same time that servo head 16B crosses servo line 1B. Due to the configuration of the servo pattern of the present invention, this simultaneous crossing can only occur if the servo head intersection is centered above data track n. Following track n in either direction illustrates that the simultaneous intersection of servo head 16A and 16B with servo lines (n) A and (n) B respectably. Thus, servo information is provided each time servo head 16A and 16b cross any of servo lines A and B.

Other data tracks are defined by the intersection of other of servo lines A and B. For example, location 23, a simultaneous intersection of servo head 16A and 16B with servo lines 3A and 5B respectively indicates servo head position over data track $n-2$. Followng data track $n-2$ along its length, we see that the simultaneous intersection of servo head 16A and 16B with the servo lines (n) A and (n+2) B respectively indicates the position of servo heads over data track $n-2$.

The servo pattern and system of the present invention provides information even when the servo heads are not positioned at servo line intersections. Referring to location 22, servo head 16B is shown crossing servo line 3B. However, servo head 16A has not yet intersected servo line 3A. By measuring the time difference between the intersection of a B servo line by servo head 16B and the intersection of an a servo line by servo head 16A, the relative position of servo head 16A and 16B may be calculated. In this case, if the intersection of a B servo line occurs prior to the intersection of an A servo line, the servo heads are displaced slightly outward of a nominal track center. Correspondingly, if an A servo line was intersected prior to the intersection of a B servo line, the servo heads would be located inward of a nominal track center. The time difference between servo line intersections is used to generate an error signal which can be used to move the servo heads to compensate for displacements from nominal track centers.

In the examples given above, nominal track centers have been defined as occurring at servo line intersections. However, the present system is independent of data track pitch such that nominal data track centers may be defined at any location in the servo pattern. For example, referring to locations 20 and 21, servo heads 16A and 16B are shown centered on data track 18, disposed between servo line intersections. In the present invention, this is accomplished b delaying all of the A servo lines by an amount that would, in effect, move the line corresponding to $n+1$ inward to line 18. The defining of a data track 18 as shown at locations 20 and 21 does not preclude the establishment of data tracks at the intersections of servo lines such as data tracks $n+1$ and $n+2$, the amount of delay is simply changed. In fact, because the servo line intersections are closer together towards the inner radius while the data tracks are regularly spaced, a large number of data tracks will fall between servo line intersections. The maximum resolution of the ability to detect data tracks between intersections is a function of the system clock rate, and is independent of the number of servo lines.

In FIG. 2, the number of data tracks is shown as being approximately equal to twice the number of servo line intersections in a radial line, such as radial line 110. Although, such a relationship could be implemented, in the preferred embodiment of the present invention there are a greater number of servo line intersections in a radial line than the number of data tracks. Each servo line intersection occurring at a fixed radius is considered to be part of a "servo track".

Because the density of servo tracks increases towards the inner radius of a disk, there is a larger number of servo tracks between successive data tracks (which are regularly spaced), at the inner radius than at the outer radius of the disk. Each servo track is assigned an number in the preferred embodiment of the present invention. A look up table is generated matching a data track with its nearest servo track number. Because many data tracks do not fall on a servo track boundary, an offset is also included in the look up table so that exact position of the data track is defined.

On start up, one servo track is defined as a reference track and is assigned a track number "0". By counting A and B servo line crossings during movement of the servo head away from the referenced head, the present servo track number and correspondingly the present data track number may be determined.

Still referring to FIG. 2, line 111 represents the path of servo heads moving at a constant velocity across the disk surface during a seek operation. In this example, the seek begins at servo track 4 and ends at servo track 0. As the servo head moves along line 111, it crosses 7 "A" servo lines and 3 "B" servo lines. Subtracting 3 from 7 leaves 4 which is the number of servo tracks crossed. Therefore, simple counters can be used to generate a gross position information signal using the servo pattern scheme of the present invention.

In the preferred embodiment of the present invention, a number of frames are defined on the disk. In this embodiment, there are 12,960 "bit cells" per revolution of the disk. A bit cell is a servo line location. Each frame contains 32 bit cells so that there are 405 frames per revolution of the disk. Each frame is defined by a boundary having an empty bit cell where no servo line is drawn. One frame is designated as a "index" frame and has an empty center bit cell. Therefore, there are 406 empty bit cells per revolution. Correspondingly, there are 12,554 flux changes per revolution in the servo pattern. However, this is given by way of example only as other configurations may be utilized without departing from the scope of the present invention.

As noted previously, the servo lines of the present invention approximate logarithmic spirals. One property of a logarithmic spiral is that it cuts all radii at a constant angle. Because the servo head moves across a disk on a radius, it will always intersect each servo line at the same angle. Thus, the angle of the gap of the servo head can be said to be coincident with the angle of intersection, maximizing the readability of the servo signal. When viewed from above on a storage disk, the servo lines appear to be convergent at the center of the disk. However, at any concentric track on the disk, each servo line is an equal distance in radians from the next servo line.

In the preferred embodiment of the present invention, the angle of intersection of each servo line with a radius of the disk is chosen to be 45 degrees. Logarithmic spirals may be drawn at any angle of intersection with a radius. In the preferred embodiment of the present invention, 45 degrees was chosen to provide the maximum separation between the servo lines and the concentric data tracks on the disk. In this manner, the maximum signal separation (due to the azimuth effect) may be achieved between data and servo tracks. However, any angle may be utilized with the present invention.

Figure 5:
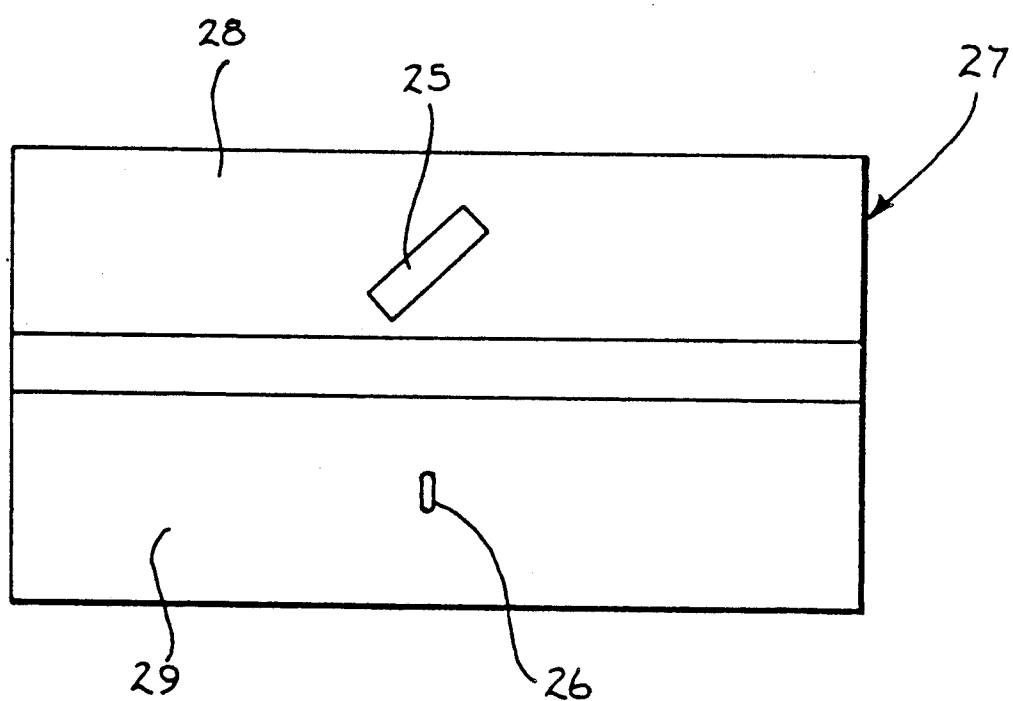
FIG. 5 is a bottom view of a dual core data/servo head.

A view of a dual core data/servo head is illustrated in FIG. 5. The dual core head 27 includes a servo head 28 and a data head 29. The servo head 28 includes a gap 25. Data head 29 includes gap 26. Servo gap 25 is at an angle of approximately 45 degrees to data gap 26. As noted previously, this angle, due to the azimuth effect, reduces the amount of cross talk between the data and servo layers. In the preferred embodiment of the present invention, the servo gap 25 is approximately 4 times as large as the data gap 26. In prior art servo schemes, the width of the servo head approximates that of the data head because the servo tracks are coincident with the data tracks. In the present invention, where the servo pattern is independent of track pitch, the size of the servo gap is independent of the size of the data gap. This permits the use of a relatively large servo gap, making it easier to detect the buried servo layer in the preferred embodiment of the present invention. Further, large gap heads are less expensive to produce than thin gap heads, thus reducing the cost of the servo head of the present invention.

Because the servo pattern of the present invention is time based, it is not necessary for the servo head to detect a unique servo signal for each data track. The time based scheme of the present invention is a "presence/absence" scheme so that a large servo signal may be used, improving the signal to noise ratio over conventional servo schemes.

The angle of the servo gap to the data gap must match the angle between the servo lines and a radius of the disk to allow maximum readability of the servo lines. In the preferred embodiment of the present invention, this angle is 45 degrees. However, any angle may be utilized for both the servo lines and the servo gap without departing from the scope of the present invention.

In prior art servo systems, servo tracks are concentric and approximate the width of the data tracks. In other words, the servo and data tracks have an approximately one to one correspondence. The servo tracks for such a prior art scheme are written one track at a time and thus require the same number of steps across the disk as there are data tracks. In the present invention, the servo pattern is track pitch independent. In the preferred embodiment of the present invention, it have been found that the servo pattern may be written in 69 steps across the disk. Regardless of the number of data tracks, the same number of steps is required for the servo pattern of the present invention. This property significantly reduces the time and expense of writing the servo pattern of the present invention.

In writing the servo pattern of the present invention, the servo head is positioned over the first track radius of the storage disk. A clocking signal is provided to synchronize the servo writing so that the appropriate number of servo lines is written, one step at a time. The disk is rotated beneath the servo head and line segments are written by inducing flux reversals in the magnetic media. The servo head is then advanced to a next track radius, slightly overlapping the previous radius. Again, the plurality of line segments is written with the servo head, with the line segments of the first radius overlapping with the line segments of the second radius.

In the preferred embodiment, the servo head is then backed up one step to read the servo pattern written up to that point to verify its accuracy. In the preferred embodiment of the present invention, only a single peak should be detected each time the servo head crosses a servo line. If too much overlap occurs, a dual peak will be induced in the servo head and false positioning information could then be generated.

If the verification is accurate, the servo head is advanced 2 steps to a third radius. With each advance in the radius of the servo head, a delay is introduced into the synchronization signal. The synchronization signal is tied to the rotation of the disk. In one embodiment, an optical shaft encoder is used to provide sector pulses which then may be multiplied up to provide a clock signal. By introducing the correct delay into the clock signals, the line segments connect to form a logarithmic spiral. In no delay was introduced, the servo lines would not be contiguous.

After the line segments are written at each radius of the disk, the servo head is backed up one step to verify the servo pattern. If verification is accurate, the servo head is moved forward 2 steps to the next radius. If verification is not accurate, the servo head writes over the invalid track.

A block diagram of the write circuitry of the present invention is illustrated in FIGS. 6A and 6B. An optical shaft encoder outputs an index signal 30 to programmable delay block 31. Bit clock 52 is a clocking signal inputted to delay block 31 and to divider 33. The bit clock 52 is divided by 8 in divider 33 to output byte clock 53. Programmable delay block 31 is utilized to synchronize the writing of individual tracks of servo line segments so as to result in a plurality of servo lines approximating logarithmic spirals. The output of programmable delay 31 is inputted to divider 33 and to repeat control 32. The programmable delay is microprocessor controlled. Information on data bus 54 is inputted to a buffer 45. The output buffer 45 in inputted to programmable delay 31, on bus 56 controlling the amount of delay for each track during servo writing.

Repeat control 32 is a frame counter which tracks the number of frames written by the servo writer. In the preferred embodiment, there are a plurality of identical frames (404) and one index frame or exception frame. Repeat control 32 outputs a control signal to select one of exception pattern FIFO 36 and normal pattern FIFO 37.

Bus 56 is also inputted to buffers 34 and 35. The output of buffer 34 is coupled to exception pattern FIFO 36 and the output of buffer 35 is inputted to normal pattern FIFO 37. Exception pattern FIFO stores the servo pattern for the index frame in which the center bit is missing. Normal pattern FIFO stores the pattern for non-index frames.

The outputs of FIFOS 36 and 37 are inputted to FIFO MUX 38 whose output is inputted to shift register 40. Normal pattern FIFO 37 also outputs a write gate control signal to write gate control 39.

The output of FIFO MUX 38 is inputted to window logic 69 and to shift register 40, along with bit clock 52 and byte clock 53. The output of shift register 40 is inputted window logic 69 and to a bit latch 41 along with bit clock 52 and write enable signal 75 which is outputted by write gate control 39. The output of bit latch 41 is inputted to a data MUX 43.

Output 56 is inputted to control ports 47 and 48. Control port 47 selects one of the heads (2 data, 2 servo) while control port 48 selects data 50 or servo 51 write current. Control port 47 outputs an oscillator enable signal 76 to erase oscillator 42. Control port 47 also outputs a select signal 77 to data MUX 43. The output of erase oscillator 42 is inputted to data MUX 43 and the select signal 77 selects either the contents of bit latch 41 or erase oscillator 42 in generating a write data output signal 74. Erase oscillator 42 is used to create guard band 13 in FIG. 4.

The verification circuitry of the present invention is illustrated in FIG. 6b. The top and bottom read back signals 57 and 58 are amplified through amplifiers 59 and 60 respectively and coupled to MUX 61. The output of MUX 61 is divided into 2 paths, with 1 path inputted to low pass filter 63 and analog to digital converter 64. The second path is coupled to digitizer 62. The output of A/D 64 is inputted on bus 56 and represents the track average amplitude. As noted, the preferred embodiment of the present invention utilizes a servo pattern in which selected servo lines are omitted to define frames. In at least one such frame, the middle servo line is omitted so as to define an index. The early window counter opens a detect window prior to the expected pulse occurrence. If an early pulse is detected, an error signal is generated. The late window counter opens a detect window after the expected pulse occurrence to detect late pulses. The outputs of early window counter 65 and late window counter 66 are inputted to window logic 69. Window logic 69 also receives an input from shift register 40. The output 71 of window logic 69 indicates early, late, missing or extra pulses during the verification of the servo pattern writing stage.

Pulse counter 67 counts the number of pulses in each servo track and outputs this count to compare logic 70. Bit clock 52 is also inputted to pulse counter 67 for synchronization purposes. Byte clock 53 inputted to frame counter 68 to count frames. The output of frame counter 68 is inputted to compare logic 70 whose output 72 indicates any errors in writing servo information.

Figure 4:
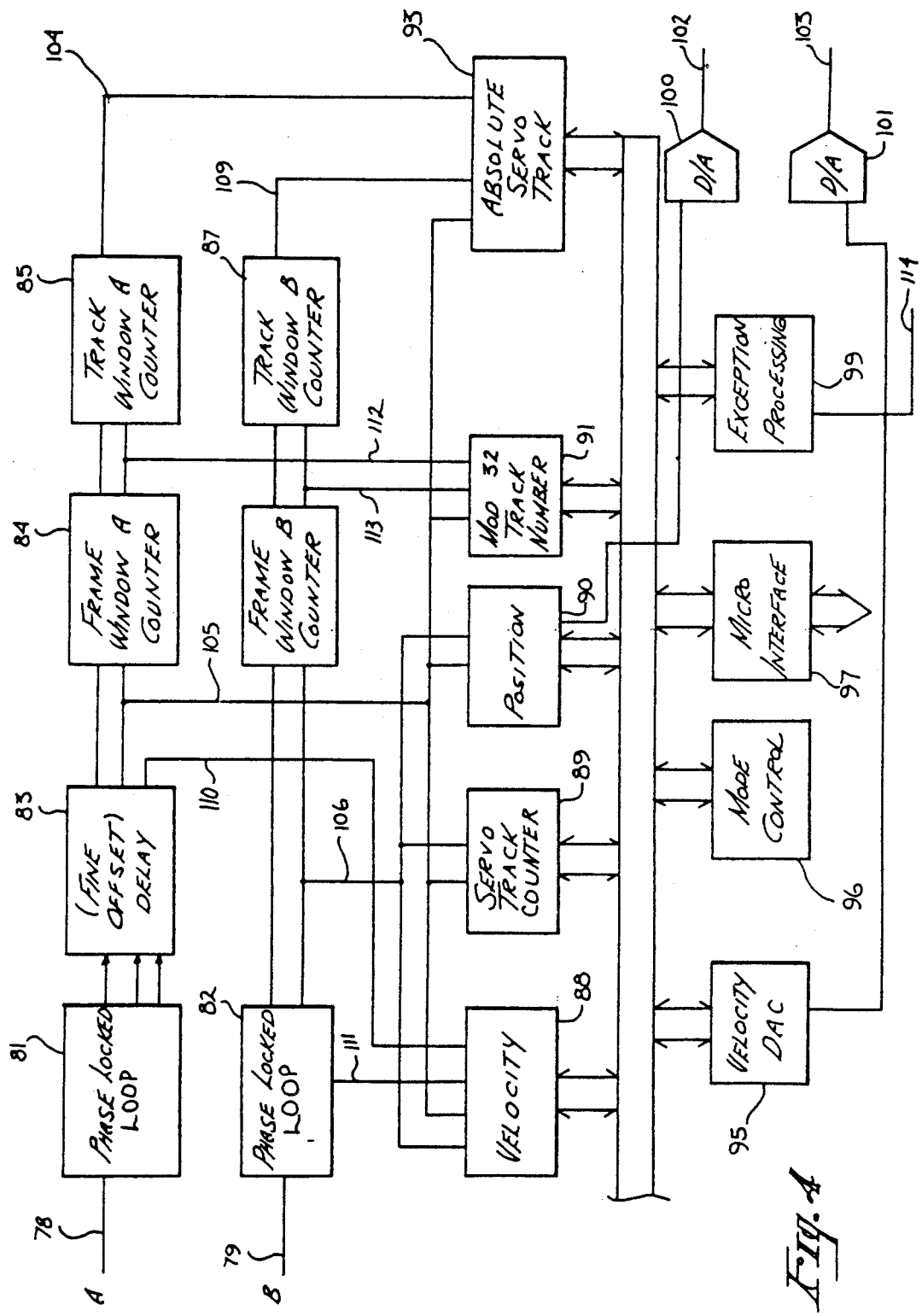
FIG. 4 is a block diagram of the decoding circuitry used in the preferred embodiment of the present invention.

The servo read circuitry of the present invention is illustrated in FIG. 4. The A servo head generates pulses 78 coupled to a phase locked loop 81 The B servo head outputs pulses 79 to phase locked loop 82. A test signal 80 is also. These phase locked loops 81 and 82, have 2 ouputs each. The first, called "out", is a filtered version of the input pulses with missing pulses replaced so that the pulse stream "out" has no features save its frequency and phase. The second output called "MISSING BIT DETECTED" indicates the missing bit in the input pulses. The outputs of phase lock counter 81 are coupled to a programmable delay which is used as a fine offset. Since certain of the data tracks lie between servo line intersections, one of the servo lines must be delayed to provide for a simultaneous detection of A and B servo lines. It would be obvious, however, that either A or B or both servo lines may be delayed to provide offset in the present invention. The outputs of fine offset delay 83 and phase lock loop 82 are coupled to frame window counters 84 and 86 respectively. The frame window counters are used to remove those missing bits not defined in the preferred embodiment of the present invention by missing servo lines in 32 line increments. In other words, every 32nd servo line is missing per frame in the present invention. The frame window counters 84 and 86 also detect the index bit.

The output of frame window counters 84 and 86 are inputted to track window counters 85 and 87 respectively. Track window counters 85 and 87 reject false index bits in which the central servo line of one frame is missing. The output of track window counters 85 and 87 is inputted to absolute servo track decoder 93. The absolute servo track decoder 93 counts the number of A servo lines 105 between A index bit 104 and B index bit 109.

The output 105 of fine offset delay 83, called "A out", is a digital signal representing the pulse detection of A servo lines. This signal 105 is inputted to velocity block 88, servo track counter 89, position control 90, modulo 32 track number decoder 91, and absolute servo track decoder 93. The output 106 of phase locked loop 82, called "B out", is the digital version of the B servo line pulses and is inputted into velocity block 88, servo track counter 89 and position control 90.

Velocity block 88 also takes as its input a digital number 110 and 111 which is directly proportional to the frequency of the A and B servo lines respectively. It accumulates these frequency samples, subtracting 111 from 110 and averages them to determine the velocity of the heads as they cross the servo lines during a seek. In this manner, the velocity of the heads may be controlled to match a velocity schedule in an ideal seek.

Upon power up of the system of the present invention, a "reference" track is established and it is considered to be servo track "0". Servo track counter 89 is cleared at this time. Servo track counter 89 actually consists of two counters, one that counts A servo lines and a second that counts B servo lines. The A counter counts in a positive direction and the B counter counts in the negative direction (or vice versa). At each sample, the two counts are summed and if the servo heads are on the reference track, the sum will be 0. As the servo head is moved across a disk, as during a seek operation, a larger number of one type of servo lines (A or B) will be crossed than the remaining type. Therefore, the result of the summing operation will be a positive or negative number depending on the number of servo tracks crossed and the direction in which the servo head is traveling. This provides a method for providing gross position information.

The position block 90 consists of three parts, the first part is a pre-scalar which eliminates every servo pulse except the nth pulse where n is a pre-determined span of servo tracks. This first part of the postion block effectively makes the servo track spacing as wide as or wider than the data track spacing, a desirable characteristic at the conclusion of a seek. To move to a servo track which is not a multiple of n, n is temporarily changed in one of the prescalars to modulo n of the servo track change desired. The prescalar chosen controls the direction.

The second part of the position block 90 is a phase comparator which compares the phase of the A/n and B/n pulses from the pre-scalar. Dependent on the direction of offset during track following the output of this phase comparator will be positive or negative. This positive or negative number is plotted as a function of distance. Because the servo lines converge near the inner radius, the slope is greater at the inner radius than at the outer radius. Therefore, a scaling factor must be introduced to the plot. The third state of the position block 90 provides a gain scale adjustment by retrieving a scaling factor from a look up table for each data track of the disk. In this manner, the same amount in change of slope will present the same change in track position, permitting easy determination of position.

Modulo servo track decoder 91 provides a redundant check on the indexing of the servo pattern of the present invention. Frame window counters 84 and 86 output framing pulses 112 and 113 to modulo servo decoder block 91.

Mode control 96 is simply a port by which the mode of the circuitry of the present invention can be set. The circuitry is in either velocity or position mode. Velocity mode is a coarse positioning scheme used during the early stages of a track seek. Position mode is a fine position scheme used to maintain proper track position once the desired track is reached to maintain proper track position.

The velocity DAC port (digital to analog converter) 95 is a micro processor port used to communicate velocity error information to d/a converter 101.

The micro interface 97 is simply an interface between a control microprocessor and the circuitry of the present invention.

Exception processing 99 tracks errors and error information from the various counters of the circuitry and outputs an interrupt or an unsafe signal 114 whenever errors exceed pre-determined limits.

D/A converters 100 and 101 output position and velocity control signals 102 and 103 respectively and are coupled to the actuator motor of a disk drive utilizing the present invention to control positioning of the heads.

In the ideal embodiment of the present invention, servo heads A and B are disposed opposite each other on the respective disk surface so as to appear to intersect when viewed from above. In reality, manufacturing tolerances and assembly procedures may result in slight offsets between the A and B servo heads in the present invention. In addition, there may be offsets between the data head read gap and servo gap of an individual head assembly. In order to compensate for such variations, the present invention contemplates the use of a calibration track, such as calibration track 109 of FIG. 3. Upon start up of a disk drive utilizing the present invention, the calibration track 109 is used to determine the offset between the A and B heads so that a time offset can be generated and used to compensate for any variation. In a prior art single surface servo scheme, such a calibration track is not necessary as long as the relationship of the heads is fixed. In the present application, it is necessary to know the exact relationship between the heads.

In the preferred embodiment of the present invention, the calibration track 109 is located at the outside radius of the disk surface. For purposes of calibration, an amplitude comparison is utilized. Equal amplitude pulses are disposed on either side of a nominal track center, but a single track of any present servo technique may be used. In the preferred embodiment, this calibration track center coincides with an intersection of the servo lines. When the servo heads are positioned on the calibration track, properly positioned servo heads will simultaneously detect the A and B servo lines at the intersection. If there is an offset in the servo head positioning, there will be a time difference in the detection of the A and B servo lines. This time difference is the offset caused by the tolerances in the servo head position. This offset can then be built into the decoding circuitry so that servo heads crossing the intersection of servo lines will have simultaneous detection. In other instances, the offset can be used to compensate after detection.

The present invention has been described in terms of a two sided servo pattern. However, the present invention has equal application to a single sided servo pattern utilizing two separate buried servo layers and surface data layer. In such a scheme, a triple gap head assembly would be utilized having two servo gaps disposed approximately perpendicularly to each other and both at angles to the data gap. The present invention can also be utilized in connection with magneto optic or other optical encoding systems for disks, tapes or any other information media. Thus, a novel servo pattern and method of reading and writing the pattern has been described.

We claim:
1. A positioning apparatus comprising:
   a rotating disk having first and second surfaces;
   a plurality of first servo lines written on said first surface of said disk, said servo lines being nonintersecting and each extending from an inner radius of said disk to an outer radius;
   a plurality of second servo lines written on said second surface of said disk, said second servo lines being non-intersecting and each extending from said inner radius to said outer radius;

first and second moveable detection means adjacent said first and second surfaces respectively, said first and second detection means for detecting said first and second servo lines respectively, independent of data written on said disk;

positioning means coupled to said first and second detection means for positioning said first and second detection means on said disk;

decoding means coupled to said first and second detection means and said positioning means;

said first and second detection means outputting first and second signals to said decoding means upon detection of one of said first and second servo lines respectively;

said decoding means including timer means for determining a time difference between said first and second signals and outputting a control signal to said positioning means dependent on said time difference, said control signal causing said positioning means to position said first and second detection means on said disk.

2. The apparatus of claim 1 wherein each of said servo lines describes a logarithmic spiral.

3. The apparatus of claim 1 wherein each of said servo line intersects a radius of said disk at a fixed angle.

4. The apparatus of claim 3 wherein said fixed angle comprises approximately 45 degrees.

5. The apparatus of claim 1 wherein said first and second detection means comprise first and second servo heads disposed at an angle parallel to said first and second servo lines respectively.

6. The apparatus of claim 1 wherein said positioning means comprises an actuator motor.

7. The apparatus of claim 1 wherein said first and second plurality of servo lines are disposed beneath first and second data layers respectively.

8. The apparatus of claim 1 wherein said first and second detection means contact said first and second surfaces, respectively, 9. An apparatus comprising:

a storage layer disposed on a substrate, said storage layer having a first edge and a second edge, said storage layer being configurable so as to store and convey information;

a plurality of first servo lines formed in said storage layer, each of said first servo lines being non-intersecting and extending from said first edge to said second edge, a plurality of second servo lines formed in said storage layer, said second servo lines being non-intersecting and extending from said first edge to said second edge, said first servo lines intersecting said second servo lines at a fixed angle so as to create a plurality of points of intersection;

a detection means disposed adjacent said storage layer, said detection means for detecting said first and second servo lines and outputting first and second signals upon detection of each of said second servo lines respectively, independent of data written on said disk;

decoding means coupled to said detection means for receiving said first and second signals and determining a time difference between occurrence of said first and second signals;

said detection means having a position dependent on said time difference and on a relative number of occurrences of said first and second signals.

10. The apparatus of claim 9 wherein said storage layer comprises a magnetic media.

11. The apparatus of claim 9 wherein said storage layer comprises a magneto optic layer.

12. The apparatus of claim 9 wherein said substrate comprises a tape.

13. The apparatus of claim 12 wherein said first servo lines are formed at a first depth and said second servo lines are formed at a second depth in said storage layer.

14. The apparatus of claim 13 further including a data layer disposed at a third depth in said storage layer.

15. The apparatus of claim 13 further including a data layer disposed at a surface of said storage layer.

16. The apparatus of claim 9 wherein said substrate comprises a disk and said first edge is an inner radius of said disk and said second edge is an outer radius of said disk.

17. The apparatus of claim 16 wherein said storage layer is disposed on either of first and second surfaces of said disk.

18. The apparatus of claim 17 wherein said first servo lines are disposed on said first surface and said second servo lines are disposed on said second surface.

19. The apparatus of claim 18 wherein said first and second servo lines are disposed beneath first and second data layers respectively.

20. The apparatus of claim 16 wherein said first servo lines are disposed at a first depth and said second servo lines are disposed at a second depth in said storage layer.

21. The apparatus of claim 20 further including a data layer disposed at a third depth in said storage layer.

22. The apparatus of claim 20 further including a data layer disposed at a surface of said storage layer.

23. A method for determining the position of a detection means disposed adjacent a storage media comprising the steps of:

forming a plurality of first servo lines in said storage media, said first servo lines being non-intersecting and each extending from a first edge of said media to a second edge of said media;

forming a plurality of second servo lines in said storage media, said second servo lines being non-intersecting and each extending from said first edge of said storage media to said second edge of said storage media;

detecting said first and second servo lines with said detection means and generating first and second signals for each occurrence of detection of said first and second servo lines respectively;

generating a time difference between occurrences of detection of said first and second servo lines;

counting occurrences of detection of said first and second servo lines;

defining a plurality of tracks on said media, each of said tracks being defined by a time difference and a relative number of occurrences of said first and second signals respectively;

determining track position by detecting said first and second signals and comparing said time difference and said number of occurrences of said first and second signals with said defined time difference and said defined number of occurrences of said first and second signal. second signals with said defined time difference and said defined number of occurrences of said first and second signal.

24. The method of claim 23 wherein said first and second servo lines are found at first and second depths in said storage media.

25. The method of claim 23 wherein said first and second servo lines are formed on first and second surfaces of said storage media, respectively.

26. The method of claim 23 wherein said first and second servo lines define logarithmic spirals.

27. A positioning apparatus comprising:
a rotating dark having first and second surfaces;
a plurality of first servo lines written on said first surface of said disk, said servo lines being non-intersecting and each extending from an inner radius of said disk to an outer radius;
a plurality of second servo lines written on said second surface of said disk, said second servo lines being non-intersecting and each extending from said inner radius to said outer radius;
first and second moveable detection means adjacent said first and second surfaces respectively, said first and second moveable detection means for detecting said first and second servo lines respectively;
positioning means coupled to said first and second detection means for position said first and second detection means on said disk;
decoding means coupled to said first and second detection means and said positioning means;
said first and second detection means outputting first and second signals to said decoding means upon detection of one of said first and second servo lines respectively, said first and second detection means comprising first and second servo heads disposed at an angle substantially parallel to said first and second servo lines respectively;
said decoding means including timer means for determining a time difference between said first and second signals and outputting a control signal to said positioning means dependent on said time difference, said control signal causing said positioning means to position said first and second detection means on said disk.

28. A method of defining a plurality of data tracks on a storage media, said tracks having a pitch defined by time, said method comprising the step of:
forming a plurality of first servo lines in said storage media, said first servo lines being non-intersecting and each extending from a first edge of said media to a second edge of said media;
forming a plurality of second servo lines in said storage media, said second servo lines being non-intersecting, and each extending from said first edge of said storage media to said second edge of said storage media;
detecting said first and second servo lines with a detecting means and generating first and second signal for each occurrence of detection of said first and second servo lines respectively;
generating a time difference between occurrences of detection of said first and second servo lines;
counting occurrences of detection of said first and second servo lines;
defining a plurality of data tracks on said media, each of said data tracks being defined by a time difference and a relative number of occurrences of said first and second signals, respectively;
whereby the number of data tracks which can be defined on said media is dependent on time and independent of said servo pattern.

* * * * *